United States Patent Office 3,180,481
Patented Apr. 27, 1965

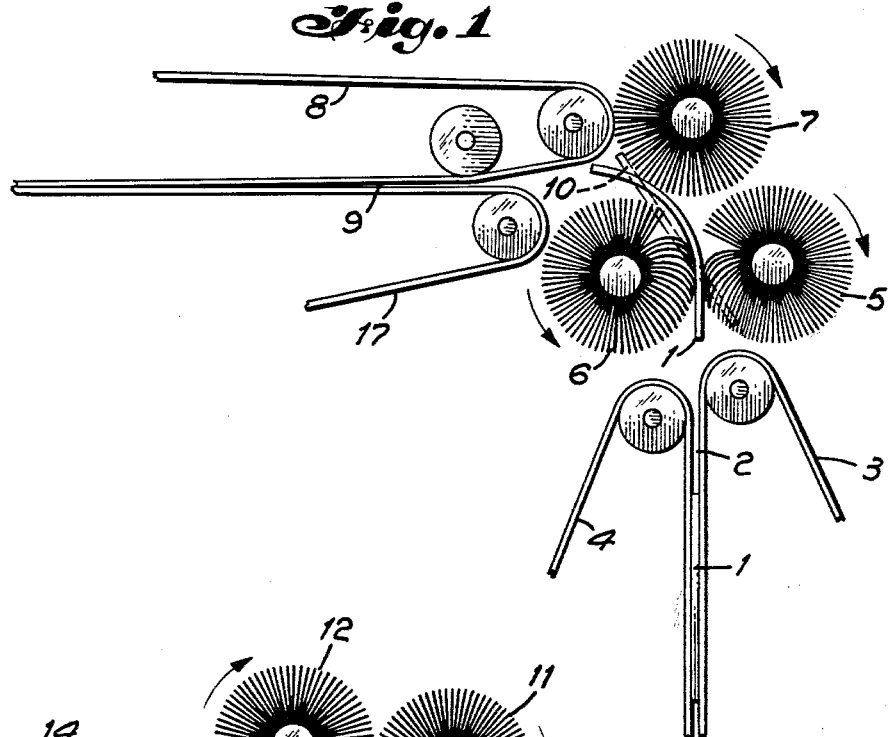
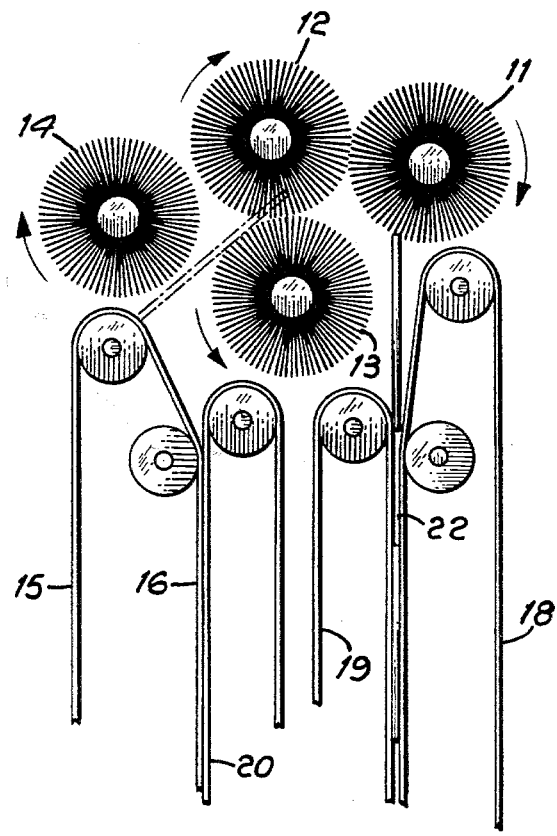

3,180,481
CORNER GUIDE FOR UPRIGHT CONVEYOR SYSTEMS
Horst Brause, Hagen, Westphalia, Germany, assignor to International Standard Electric Corporation, New York, N.Y., a corporation of Delaware
Filed Sept. 25, 1962, Ser. No. 226,131
Claims priority, application Germany, Sept. 28, 1961, 18,382
8 Claims. (Cl. 198—167)

This invention relates to means for changing the direction of articles in an edgewise conveying system and more particularly to corner guides for documents in edgewise document sorting systems.

One conventional system for changing the direction of articles in an edgewise conveying system consists of a curved trough through which the articles are guided by means of a conveyor located beneath the trough. This arrangement has proved to be both expensive and bulky. Another known arrangement consists of a deflecting roller which is encircled by a tight fitting belt. Items coming from an upright conveyor trough are guided around the corner by means of the deflecting rollers. In this arrangement the change of direction is made in the narrowest space, however, it is not possible to send stiff items through this arrangement. Known arrangements for guiding documents of varying thickness and flexibility have proved to be unsatisfactory.

It is therefore an object of my invention to provide a system for changing the direction of articles in edgewise conveying systems which is inexpensive and compact.

Another object of my invention is the provision of a system for changing the direction of articles of varying thicknesses and degrees of flexibility in an edgewise conveying system.

A novel feature of my invention is the use of at least three rollers or cylinders which cooperate with a corner guide to effect a change in the direction of articles which are fed through this apparatus.

Another novel feature of my invention is the use of brushes shaped like rollers which cooperate with a corner guide to effect a change of direction in articles which are fed through this apparatus.

The above-mentioned and other features and objects of this invention will become more apparent by reference to the following description taken in combination with the accompanying drawings, in which:

FIGURE 1 is a schematic representation of apparatus in accordance with my invention for effecting a 90° change in direction of articles;

FIGURE 2 is a schematic representation of apparatus in accordance with my invention for changing the direction of articles which are fed into it by 180°.

My invention comprises an arrangement of at least three rollers or cylinders which cooperate with a corner guide to effect a desired change in the direction of articles which are fed into it. Two of the rollers or cylinders are adjacent, one being on either side of a conveyor path along which the articles are carried. At least one of these is a brush and at least one is driven in the direction of conveyor movement. The distance between these two rollers should be less than the minimum thickness of articles to be conveyed so that they will all be positively seized by the rollers and will maintain their edgewise position. The rollers are driven at a speed which is greater than that of the conveyor which feeds them into the rollers and that which takes them away from the rollers.

Referring now to FIGURE 1 in which is shown my arrangement for causing documents to transverse a 90° change in direction. Documents 1 are fed via the conveying channel 2 by means of the parallel belts 3 and 4 to the brushes 5 and 6. The document 1 is first seized by the pair of brushes 5 and 6 which are both rotating in the conveyor direction and then the leading edge of the document 1 is seized by the reversing brush 7 located behind the brushes 5 and 6 which causes the document 1 to engage the corner guide consisting of the guiding belt 8 and thus to be conveyed along the conveying channel 9 which is perpendicular to the conveyor channel 2 via the conveyor belts 8 and 17 to its destination. It can be seen that the arrangement of the rollers 5, 6, and 7, and the guiding belt 8 can be varied so as to effect a turn of approximately 0 to 120°. For stiffer items the turn should not exceed 90°. The reversing brush 5 turns at a higher speed in order to support and boost the turning action. The arriving items may be of varying size, thickness, and flexibility, since the brushes adapt to these properties. By means of the dotted lines it can be seen that the stiff item 10 passes through the brush arrangement causing the bristles to give way to the stiff item while allowing the item to effect its turn within a small radius.

Referring now to FIGURE 2 in which is shown my arrangement for changing the direction of articles by approximately 180°. Four rollers are required for this purpose. In the embodiment shown, all the rollers are brush rollers. Articles are fed via the conveying belts 18 and 19, via the conveying channel 22 to the roller 11 which is rotating in the direction of conveyance. It can be seen that the article will be forced against the reversing roller 12 and then between the reversing roller 12 and the roller 13 which cooperates with the roller 12 to effect a 90° turn of the document. The document then strikes the roller 14 which changes its direction by approximately 45° with respect to the position it assumed between the rollers 12 and 13. Next the document strikes the guiding belt 15 which causes it to be turned another 45° and feeds it into the conveying channel 16 via the belts 15 and 20. Thus it can be seen that the document's direction of movement is completely reversed as the direction of movement of the conveyor channel 22 is 180° out of phase with that of the conveyor channel 16.

While I have described above the principles of my invention in connection with specific apparatus, it is to be clearly understood that this description is made only by way of example and not as a limitation to the scope of my invention, as set forth in the objects thereof and in the accompanying claims.

What is claimed is:

1. Apparatus for changing the direction of conveyance of flat articles having varying thicknesses and degrees of flexibilty in an edgewise conveying system comprising:
   (a) input means;
   (b) output means which include guiding means;
   (c) at least three brush rollers which coact with said guiding means to effect a desired change in the direction of conveyance of conveyed flat articles; and
   (d) means for rotating each of said brush rollers.

2. Apparatus according to claim 1 wherein said input means and output means comprise edgewise conveying channels having different direction of conveyance.

3. Apparatus according to claim 1 comprising four brush rollers which coact with said guiding means to cause flat articles to traverse a 180° turn.

4. Apparatus according to claim 1 wherein one of said rollers is so positioned and rotated that the tangential velocity of said positioned roller is perpendicular to the direction of conveyance of said input means at the point of contact of the flat articles with said positioned roller.

5. Apparatus according to claim 4 wherein two of said rollers other than said positioned roller are disposed on opposite sides of the input conveying channel, said two rollers being spaced apart a distance which is smaller than the thickness of the flat articles to be conveyed.

6. Apparatus according to claim 5 wherein said positioned roller and said two rollers are the only rollers and said rollers are so positioned that the axes of the rollers approximately form the vertices of an equilateral triangle whereby a 90° change in the direction of conveyance is effected.

7. Apparatus according to claim 6 wherein said third roller has a tangential velocity which exceeds that of the input and output conveying systems.

8. Apparatus according to claim 6 wherein said output conveying system comprises two parallel belts and wherein a portion of one of said parallel belts forms said guiding means which coacts with said rollers to guide and turn documents into said output channel.

References Cited by the Examiner

UNITED STATES PATENTS

| 1,116,943 | 11/14 | Snow | 198—165 X |
| 1,187,716 | 6/16 | Cumfer | 214—7 X |
| 2,624,992 | 1/53 | Saifisberg | 271—51 X |

SAMUEL F. COLEMAN, *Primary Examiner.*

WILLIAM B. LA BORDE, ERNEST A. FALLER, Jr.,
*Examiners.*